United States Patent [19]

Yasuhara

[11] 4,345,429

[45] Aug. 24, 1982

[54] SOOT TREATMENT DEVICE FOR A DIESEL ENGINE

[75] Inventor: Seishi Yasuhara, Yokosuka, Japan

[73] Assignee: Nissan Motor Co., Ltd., Japan

[21] Appl. No.: 141,696

[22] Filed: Apr. 18, 1980

[30] Foreign Application Priority Data

Apr. 24, 1979 [JP] Japan .................................. 54-49656

[51] Int. Cl.³ ............................................ F02M 25/06
[52] U.S. Cl. ...................................... 60/279; 60/297; 60/311; 123/1 A; 123/304
[58] Field of Search ................. 60/274, 279, 297, 311; 123/304, 568, 569, 1 A, 575

[56] References Cited

U.S. PATENT DOCUMENTS

| 1,710,365 | 4/1929 | Leonard | 123/569 |
| 1,800,771 | 4/1931 | Best | 60/279 |
| 2,673,446 | 3/1954 | Salardi | 60/279 |
| 3,216,181 | 11/1965 | Carpenter | 60/310 |
| 3,556,734 | 1/1971 | Peterson | 60/310 |
| 3,999,967 | 12/1976 | Aoi | 123/568 |

FOREIGN PATENT DOCUMENTS

| 749608 | 11/1944 | Fed. Rep. of Germany . | |
| 594130 | 12/1977 | Switzerland . | |
| 1334472 | 10/1973 | United Kingdom | 60/311 |

Primary Examiner—Douglas Hart
Attorney, Agent, or Firm—Lane, Aitken, Kice & Kananen

[57] ABSTRACT

A soot treatment device for a Diesel engine comprises a soot collector arranged in an exhaust gas system including a cyclone, wire nets and an atomizer for spraying engine oil into exhaust gases passing through the soot collector, an oil supply circuit for supplying the engine oil to the soot collector, an oil feed circuit for feeding the engine oil containing soot collected in the soot collector to a fuel system of the engine and control means for actuating these circuits at determined timing, thereby again burning the collected soot together with fuel in the engine.

7 Claims, 8 Drawing Figures 4,345,429

SOOT TREATMENT DEVICE FOR A DIESEL ENGINE

BACKGROUND OF THE INVENTION

1. Field of the Invention

The present invention relates to a soot treatment device for treating soot included in exhaust gases emitted from Diesel engines.

2. Description of the Prior Art

It has been known for Diesel engines to provide a soot collector in an exhaust gas system of the engine in order to remove the soot contained in exhaust gases emitted from the engine. In the prior art, however, the soot is collected while the engine operates under low speed or lightly loaded conditions, and thus collected soot is burned with the aid of exhaust gases at high temperatures during high speed or heavily loaded to purify the interior of the soot collector. According to operating conditions, therefore, there is a tendency for too much of the soot to be accumulated in the collector with the result that collecting and combustion efficiencies for the soot are reduced. In addition, according to the prior art, as the soot burns in the collector, even trapping materials in the collector for catching the soot are burned together with the soot under the worst conditions and there is a risk of a great amount of soot escaping from the collector without being burned.

SUMMARY OF THE INVENTION

It is an object of the invention to provide a soot treatment device for a Diesel engine which eliminates all the shortcomings of the prior art and which collects soot and mixes the collected soot into fuel so as to burn the soot again together with the fuel.

To accomplish this object the soot treatment device for a Diesel engine according to the invention comprises a soot collector arranged in its exhaust gas system for collecting soot in exhaust gases and means for mixing the soot collected in said soot collector into fuel for the engine so as to be again burned together with the fuel in the engine.

The invention will be more fully understood by referring to the following detailed specification and claims taken in connection with the appended drawings.

DETAILED DESCRIPTION OF THE PREFERRED EMBODIMENT

Figure 1:
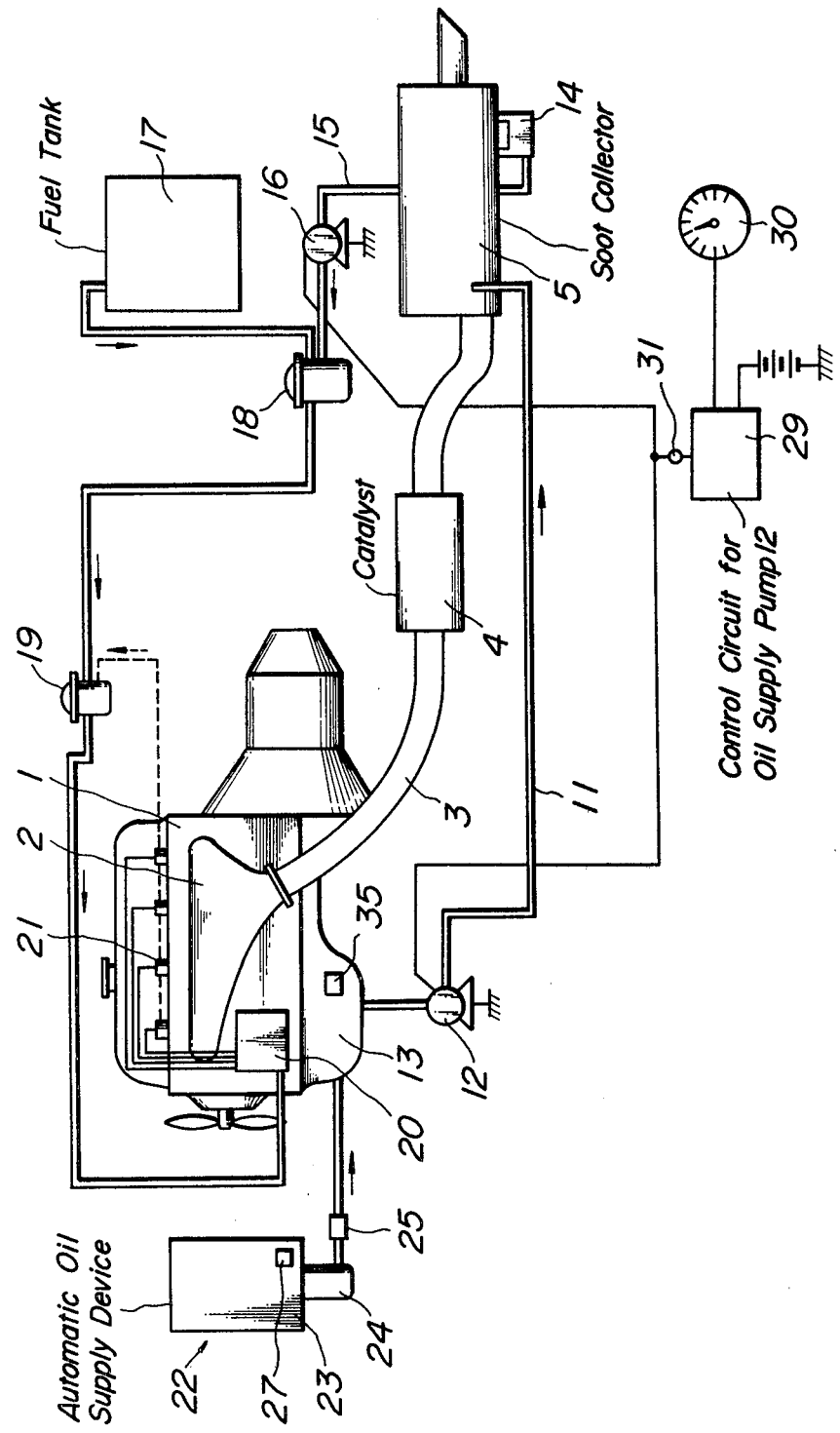
FIG. 1 is an elevation illustrating one embodiment of the present invention.
Figure 2:
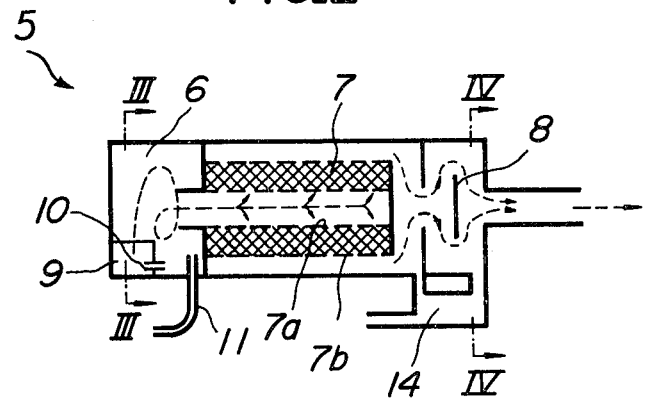
FIG. 2 is a sectional view of a soot collector to be used in the device according to the invention.

Referring to FIG. 1, a Diesel engine 1 has an exhaust manifold 2 to which is connected through a front tube 3 a catalyst 4 which has its downstream end connected to a soot collector 5.

Figure 5:
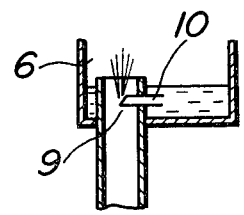
FIG. 5 is a sectional view showing a sprayer to be used in the device according to the invention.

As shown in FIGS. 2-5, the soot collector 5 comprises a cyclone 6 receiving exhaust gases flowing thereinto through its bottom outer periphery, wire nets 7 filled between perforated plates 7a and 7b in the form of double cylinders, and a baffle plate 8. The exhaust gas entered in the cyclone 6 flows through the wire nets 7 into a chamber having therein the baffle plate 8 and flows oout of the collector 5. The cyclone 6 includes an inlet 9 for the exhaust gas which is provided with a spray pipe 10 as an oil atomizer or sprayer for spraying engine oil supplied through an oil pipe 11 to the bottom of the cyclone 6 into the exhaust gas in the cyclone 6 with the aid of the spraying function of the spray pipe 10 (FIG. 5). The oil pipe 11 is connected to an oil pan 13 of the engine 1 through an oil supply pump 12 (FIG. 1). As an alternative, the oil pipe may be connected to a discharge pipe of an oil pump equipped on the engine.

The chamber including the baffle plate 8 is provided in its bottom with an oil reservoir 14 to which is connected an oil pipe 15 which is in turn connected through an oil feed pump 16 to a fuel tank 17 or an upstream side of a fuel filter 18. In this case, the fuel filter 18 is preferably provided with magnets therein for removing iron dust in the fuel. A secondary fuel filter 19, a fuel injection pump 20 and a fuel injection valve 21 are also provided.

Figure 6:
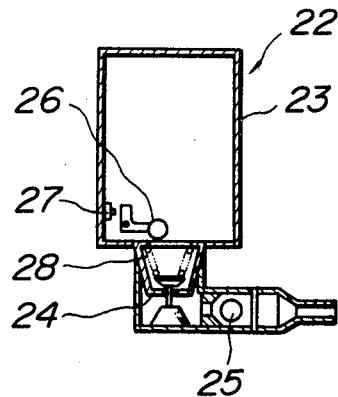
FIG. 6 is a sectional view illustrating an automatic oil supply device to be used in the device according to the invention.

An automatic oil supply device 22 is connected to the oil pan 13 to keep the oil level in the pan 13 at a determined height. As shown in FIG. 6, the automatic oil supply device 22 comprises a reservoir 23, an open and close valve 24 and a check valve 25. When the oil level in the oil pan 13 has lowered below the determined value, the air enters the reservoir 23 through the open and close valve 24 to cause fresh engine oil to be supplied from the reservoir 23 to the oil pan 13. On the other hand, when the oil level in the oil pan 13 has risen, the air is prevented from entering the reservoir 23 to stop the supply of the oil. In this manner, the oil level in the oil pan 13 is maintained at the determined value. The reservoir 23 is provided therein with a float 26 and a limit switch 27 for operating a warning device (not shown) when the oil level in the reservoir becomes lower than the determined value. The check valve 25 serves to prevent the oil from flowing out of the oil pan 13 in a direction reverse to the oil supply direction. In case that the position of the oil reservoir 23 is sufficiently high, the check valve 25 may be dispensed with. When the oil reservoir 23 is removed from the principal part of the automatic oil supply device 22, a spring 28 closes the valve 24 to prevent the oil from leaking out the oil reservoir 23.

Figure 7:
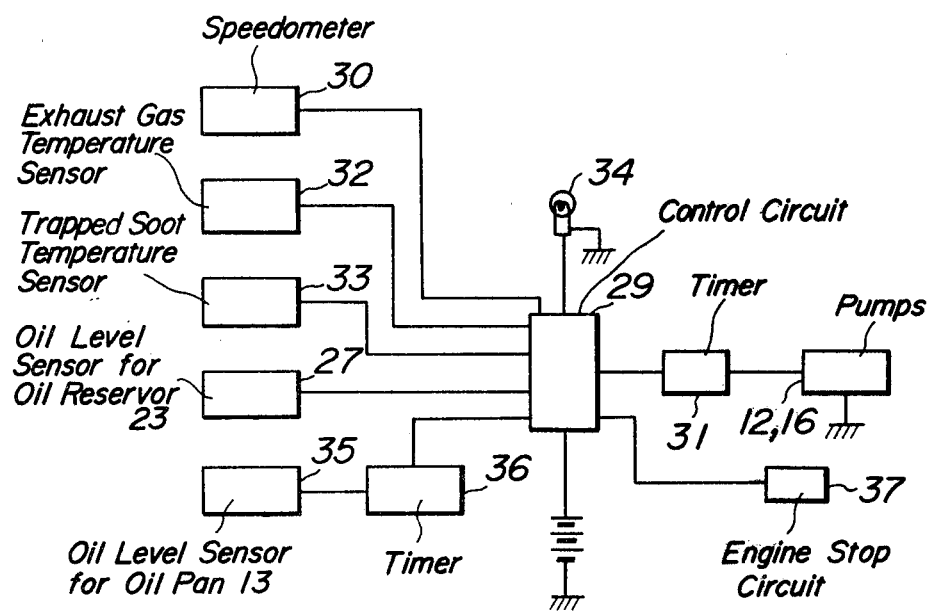
FIG. 7 is a block diagram of control means to be used in the device according to the invention.

A control circuit 29 for the oil supply pump 12 and oil feed pump 16 causes these pumps to operate for a determined period of time by means of trip signals emitted from a speedometer 30, for example, every 100 km travelling. The time for operating these pumps is so controlled by a timer 31 that the amount of the oil supplied to the oil pan is substantially constant, for example, 100 cc. On the other hand, speeds of a vehicle detected in the speedometer 30 and temperatures detected in an exhaust gas temperature sensor 32 and trapped soot temperature sensor 33 are inputted to the control circuit 29 as shown in FIG. 7. If the detected speeds and temperatures are higher than determined values, the pumps 12 and 16 are not operated even the trip signals are given. Furthermore, when the limit switch (oil level sensor) 27 provided in the reservoir 23 operates, a warning lamp 34 is energized. If an oil level sensor 35 provided in the oil pan 13 of the engine 1 detects the level of the oil in the oil pan 13 lower than the determined value continuously, for example, longer than thirty minutes, an engine stop circuit 37 is actuated through a timer 36 for stopping the engine.

Figure 3A:
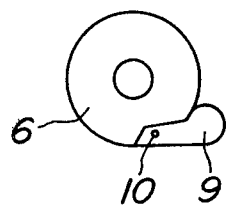
FIG. 3a is a sectional view of the collector taken along the line III—III in FIG. 2.
Figure 3B:
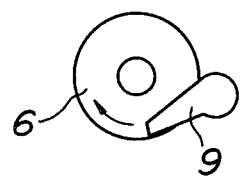
FIG. 3b is a sectional view similar to FIG. 3a illustrating another embodiment of the collector according to the invention.
Figure 4:
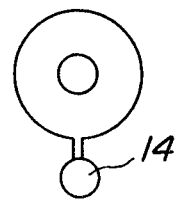
FIG. 4 is a sectional view of the collector taken along the line IV—IV in FIG. 2.

With this arrangement, the exhaust gas emitted from the engine 1 passes through the catalyst 4, in which unburned components, particularly HC, CO and the like in the exhaust gas are removed, into the soot collector 5. This exhaust gas flows in swirling streams in the cyclone 6 of the soot collector 5. On the other hand, the oil reserved in the bottom of the cyclone 6 is atomized into the exhaust gas in the cyclone 6 by means of the spray pipe 10 at the inlet 9 for the exhaust gas provided on the cyclone 6, so that the atomized oil absorbs the soot in the exhaust gas and enters the wire nets 7 together with the exhaust gas. When the exhaust gas passes through the wire nets 7 in this manner, the oil in the exhaust gas is collected on the wire nets 7 and the oil attached to the wire nets 7 flows down absorbing the soot in the exhaust gas and then flows through the bottom of the collector 5 into the oil reservoir 14. The exhaust gas from which the soot has been removed in the wire nets 7 then impinges against the baffle plate 8 at which moment the remaining oil in the exhaust gas is removed and simultaneously the exhaust gas is silenced and then flows out of the collector 5. The inlet 9 of the cyclone 6 for the exhaust gas is so constructed that the exhaust gas flows from the outer periphery of the bottom into the cyclone as shown in FIG. 3a or flows toward the outer periphery of the bottom into the cyclone as shown in FIG. 3b, whereby the oil reserved at the bottom is blown upwardly to obtain an effect the same as the bubbling effect and to wet the inner peripheral surface of the cyclone thereby effectively collecting the soot. In addition, the soot collector 5 serves as a muffler because of the cyclone 6 absorbing mainly sounds of low frequencies and the wire nets 7 absorbing mainly sounds of high frequencies.

The oil stored in the oil reservoir 14 is fed into a fuel system by means of the oil feed pump 16 so as to be mixed in the fuel and then burned in the engine.

Furthermore, the oil supply pump 12 is operated in synchronism with the operation of the oil feed pump 16 to supply the oil from the oil pan 13 of the engine 1 into the soot collector 5. As the consumption of the oil in this procedure is very slight, a small amount of oil (for example, 100 cc) may be supplied to the soot collector 5 at a determined interval, for example, at each determined travelling distance such as 100 km on the basis of the speedometer. Moreover, in order to avoid combustion of the oil in the soot collector 5 or to prevent the oil from escaping together with the exhaust gas when a vehicle travels at high speeds or the temperatures of the exhaust gas are high, at least the oil supply pump 12 is preferably kept inoperative as above described to stop the supply of the oil. When the oil supply pump 12 is replaced with an oil pump equipped on the engine, the supply of the oil can be achieved in the same manner by providing a solenoid valve in substitution for the oil supply pump 12.

In addition, if the amount of the oil in the oil pan 13 reduces, fresh oil is automatically replenished from the automatic oil supply device 22 correspondingly. The engine oil is therefore automatically exchanged with fresh oil little by little, so that a so-called "maintenance free" oil supply can be realized.

As above described, according to the invention the soot collected in the soot collector is mixed in the fuel and again burned together with the fuel, whereby the soot is not accumulated in the collector without requiring any particular re-treatment of the soot. According to the invention, moreover, the used engine oil is sprayed into the exhaust gas to absorb the soot therein, so that the soot collecting efficiency becomes remarkably high and the engine oil is automatically exchanged with fresh oil little by little without requiring an engine oil exchanging operation to facilitate the maintenance of the engine.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A soot treatment device for a diesel engine which includes an exhaust system, comprising:
    a soot collector arranged in said exhaust gas system for collecting soot in exhaust gases; and
    means for suspending collected soot in an oil and thereafter mixing said oil into fuel for the engine so as to be again burned together with the fuel in the engine.

2. A soot treatment device as set forth in claim 1, wherein said oil is an engine oil which has been used for the engine.

3. A soot treatment device as set forth in claim 2, wherein said soot collector comprises a cyclone and wire nets, through which the exhaust gas passes, and said device comprises an oil supply circuit for supplying the engine oil in the engine to said soot collector through an atomizer, an oil feed circuit for feeding the engine oil in said soot collector to a fuel system, control means for actuating these circuits at predetermined timing and an automatic oil supply device for maintaining said engine oil in the engine at a predetermined level.

4. A soot treatment device as set forth in claim 3, wherein an inlet of said cyclone is provided in the proximity of a bottom of said cyclone.

5. A soot treatment device as set forth in claim 3, wherein said atomizer for the engine oil is provided at an inlet of said cyclone for the exhaust gas.

6. A soot treatment device as set forth in claim 3, wherein said control device makes at least said oil supply circuit inoperative when any one of speed of said engine and travelling speed of a vehicle has become higher than a predetermined value.

7. A soot treatment device as set forth in claim 3, wherein said control device makes at least said oil supply circuit inoperative when the temperature of any one of the exhaust gas and said soot collector has become higher than a predetermined value.

* * * * *